United States Patent
Martell

(10) Patent No.: US 10,244,279 B1
(45) Date of Patent: Mar. 26, 2019

(54) SYSTEMS AND METHODS OF TIME ZONE SPECIFIC SCHEDULING OF STREAMING CONTENT

(71) Applicant: Martell Broadcasting Systems, Inc., Brooklyn, NY (US)

(72) Inventor: Carey Ray Martell, San Marcos, TX (US)

(73) Assignee: Martell Broadcasting Systems, Inc., Brooklyn, NY (US)

(*) Notice: Subject to any disclaimer, the term of this patent is extended or adjusted under 35 U.S.C. 154(b) by 0 days.

(21) Appl. No.: 15/978,853

(22) Filed: May 14, 2018

(51) Int. Cl.
H04N 21/262 (2011.01)
H04N 21/2187 (2011.01)
H04N 21/437 (2011.01)

(52) U.S. Cl.
CPC ... *H04N 21/26275* (2013.01); *H04N 21/2187* (2013.01); *H04N 21/26241* (2013.01); *H04N 21/437* (2013.01)

(58) Field of Classification Search
None
See application file for complete search history.

(56) References Cited

U.S. PATENT DOCUMENTS

| 8,521,899 | B2 | 8/2013 | Narula |
| 9,258,589 | B2 | 2/2016 | Grouf |
| 9,699,515 | B2 | 7/2017 | Grouf |
| 9,712,884 | B2 | 7/2017 | Grouf |
| 2009/0228920 | A1 | 9/2009 | Tom |
| 2014/0082673 | A1* | 3/2014 | Nishizawa ......... H04N 21/4622 725/52 |
| 2015/0106505 | A1* | 4/2015 | Ramaswamy ......... G06Q 30/02 709/224 |
| 2018/0014076 | A1 | 1/2018 | Shanson |
| 2018/0014077 | A1 | 1/2018 | Hou |
| 2018/0278991 | A1* | 9/2018 | Tapse ............... H04N 21/44204 |

FOREIGN PATENT DOCUMENTS

| WO | 2015123572 A1 | 8/2015 |
| WO | 2018009408 A2 | 1/2018 |

OTHER PUBLICATIONS https://www.indiegogo.com/projects/martell-tv-mobile-video-view-application#/; Indiegogo, Martell TV—Mobile Video View application; downloaded May 14, 2018.

\* cited by examiner

*Primary Examiner* — Hsiungfei Peng
(74) *Attorney, Agent, or Firm* — Lynch LLP

(57) ABSTRACT

Systems and methods of content scheduling are disclosed in this application. Methods of the inventive subject matter facilitate scheduling of streaming content that is hosted on websites such as YouTube and Vimeo. Schedules can be different based on the time zone in which a client computer attempts to access the content on the schedule. Methods disclosed in this application make it easy to quickly schedule an entire season of a show to run during a time period based on time zone. Methods disclosed in this application also facilitate modifying, creating, or implementing channel schedules across one or more time zones, where the channel schedule includes episodes of video content.

14 Claims, 2 Drawing Sheets

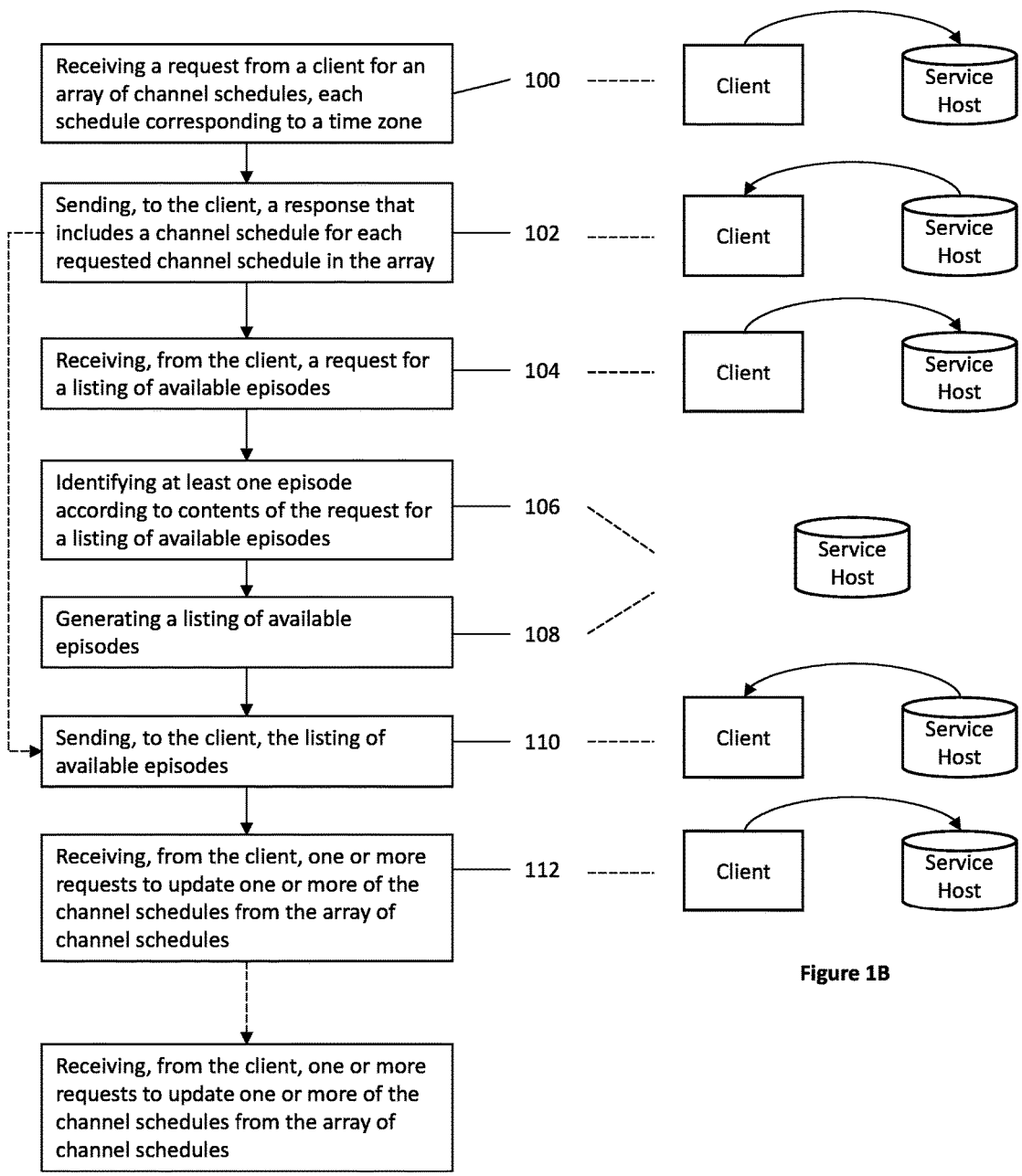

SYSTEMS AND METHODS OF TIME ZONE SPECIFIC SCHEDULING OF STREAMING CONTENT

FIELD OF THE INVENTION

The field of the invention is content scheduling.

BACKGROUND

The background description includes information that may be useful in understanding the present invention. It is not an admission that any of the information provided in this application is prior art or relevant to the presently claimed invention, or that any publication specifically or implicitly referenced is prior art.

Efforts to create new modes of media consumption have evolved throughout the years. Traditionally, people watched TV, which broadcast content according to set schedules. Frequently, those schedules differ by time zone so that certain shows and programming could be viewed at reasonable hours on both coasts of the United States, for example. In the past, traditional broadcast models have implemented tape delays to ensure that content broadcast in, for example, the eastern time zone at 6 pm can also be viewed at 6 pm in the Pacific time zone. But as viewing habits evolve and people move toward more on-demand services like Netflix, Hulu, and YouTube, traditional scheduling has started to become irrelevant.

But on-demand services fail to capture a new type of market for media consumption that hybridizes the consumption of online, on-demand content with the traditional model of scheduling content for broadcast according to channels and time zones. For example, YouTube allows people to run "channels," which allows channel owners to profit from their content via advertising agreements with YouTube. But YouTube does not allow its users to set a schedule where content can be consumed on a set schedule simply by tuning into that channel.

Moreover, because this hybrid model of placing on-demand content into structured schedules does not yet exist, the tools to facilitate this kind of scheduling similarly do not exist. Innovators in this field have failed to adequately develop tools for content scheduling that can facilitate the scheduling of streaming content that can be viewed in different times zones. In the same way, there has never before been a need for a tool that can facilitate scheduling of completely different streaming content schedules for different locations based on time zone.

It has yet to be appreciated that there is a need for new tools to facilitate content scheduling of videos that are available for on-demand streaming, and especially a need for tools that facilitate easy scheduling of content across multiple time zones.

SUMMARY OF THE INVENTION

The present invention provides systems and methods of scheduling content for consumption and viewing over a network connection.

In one aspect of the inventive subject matter, a networked, programmatic method of scheduling video content is contemplated, the method comprising the steps of: receiving, from a client by a server, a request for a first schedule corresponding to a first time zone and a second schedule corresponding to a second time zone, the request comprising a station ID; sending, by the server to the client, a response based on the station ID and at least one of the date and the time.

The response comprises: a first schedule comprising (1) a first timeline comprising a first episode having first episode attributes and (2) a first timeZoneID corresponding to the first time zone, wherein the first episode attributes comprise a first episode ID and a first release time; and a second schedule comprising (1) a second timeline comprising a second episode having second episode attributes and (2) a second timeZoneID corresponding to the second time zone, wherein the second episode attributes comprise a second episode ID and a second release time.

Next, the method comprises the steps of: sending to the client the listing of available episodes, the listing further comprising episode attributes associated with at least one episode, the episode attributes comprising a third episode ID; receiving, from the client, a third request to create a first updated schedule, the third request comprising (1) a first updated timeline and (2) the first timeZoneID, the first updated timeline comprising a first episodeID, a first release date, and a first release time; receiving, from the client, a fourth request to create a second updated schedule, the fourth request comprising (1) a second updated timeline and (2) the second timeZoneID, the second updated timeline comprising a second episodeID, a second release date, and a second release time.

The episode attributes can additionally include one, or any combination of a categoryColor, a duration, an isLive, a name, and a showName.

In some embodiments, the method additionally includes the steps of creating the first updated schedule using the third request and the first schedule and creating the second updated schedule using the fourth request and the second schedule. It is contemplated that the request for the first schedule further comprises a date and a time.

In some embodiments, the first episode attributes further comprise one, or any combination of: a first categoryColor; a first duration; a first isLive attribute; a first name; and a first showName. The same is contemplated for the second episode attributes, which can further comprise one, or any combination of: a second categoryColor; a second duration; a second isLive attribute; a second name; and a second showName.

In some embodiments, the method additionally includes the steps of: receiving, from the client, a second request for a listing of available episodes, the second request comprising the stationID and a filter parameter; identifying at least one episode according to the stationID and the filter parameter; and generating a listing of available episodes comprising the at least one episode.

In another aspect of the inventive subject matter, a method of scheduling video content is contemplated, the method including the steps of: receiving, from a client, a request to schedule content comprising: a from date, a to date, a time, a day indicator, show information comprising a show ID, and an array of time zone information, comprising a first time zone ID and a second time zone ID; and using the request to schedule content to update a first schedule corresponding to the first time zone ID and to update a second schedule corresponding to the second time zone ID.

In some embodiments, the method further comprises the step of sending, to the client, a success indicator to acknowledge successful processing of the request.

It is contemplated that the show information can further include a show name and a season indicator. The array of time zone information, in some embodiments, further comprises at least one of: a first time zone code; a first time zone display name; a first time offset; a second time zone code; a second time zone display name; and a second time offset.

It is contemplated that the methods described in this application can be carried out by one or more computers by executing software stored in non-transitory memory.

Various objects, features, aspects and advantages of the inventive subject matter will become more apparent from the following detailed description of preferred embodiments, along with the accompanying drawing figures in which like numerals represent like components.

BRIEF DESCRIPTION OF THE DRAWING

FIG. 1A is a flowchart of a method of the inventive subject matter.

FIG. 1B shows interactions between a client and service host according to the method shown in FIG. 1A.

DETAILED DESCRIPTION

Figures 2A, 2B:
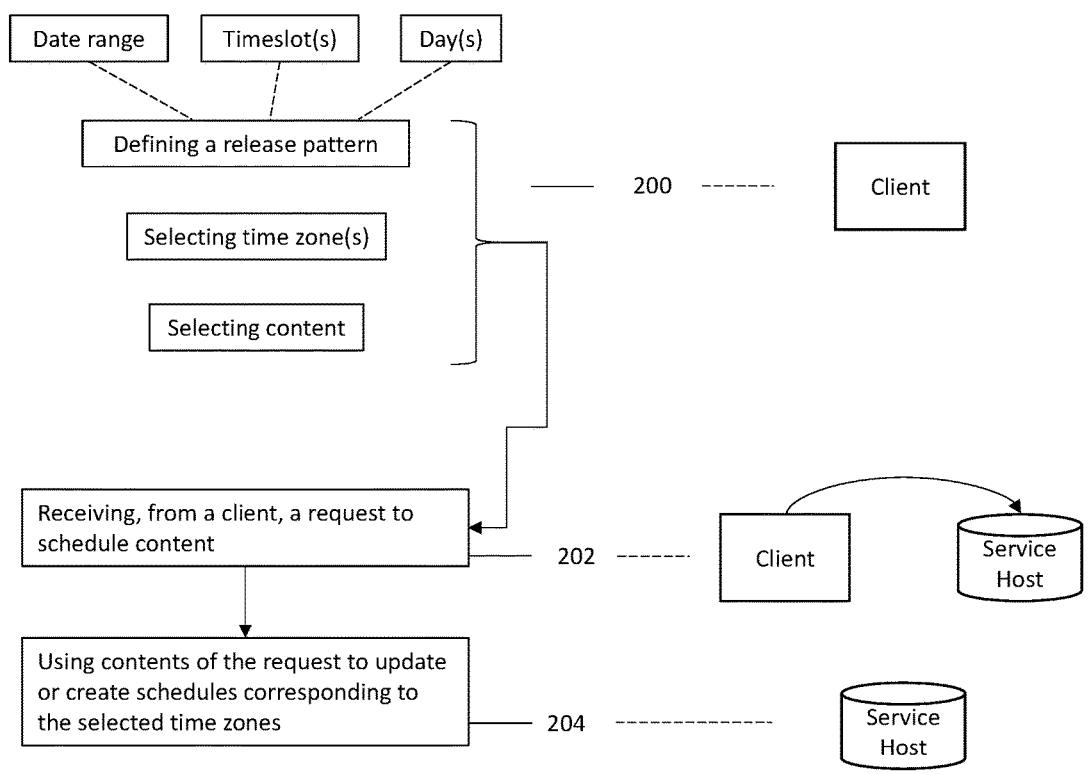
FIG. 2A is a flowchart of a method of the inventive subject matter.
FIG. 2B shows interactions between a client and service host according to the method shown in FIG. 2A.

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

In some embodiments, the numbers expressing quantities of ingredients, properties such as concentration, reaction conditions, and so forth, used to describe and claim certain embodiments of the invention are to be understood as being modified in some instances by the term "about." Accordingly, in some embodiments, the numerical parameters set forth in the written description and attached claims are approximations that can vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the invention are approximations, the numerical values set forth in the specific examples are reported as precisely as practicable. The numerical values presented in some embodiments of the invention may contain certain errors necessarily resulting from the standard deviation found in their respective testing measurements. Moreover, and unless the context dictates the contrary, all ranges set forth in this application should be interpreted as being inclusive of their endpoints and open-ended ranges should be interpreted to include only commercially practical values. Similarly, all lists of values should be considered as inclusive of intermediate values unless the context indicates the contrary.

It should be noted that any language directed to a computer should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Throughout this application, the term "array" is used. "Array" should be interpreted to mean any data structure—either known or discovered in the future—that is capable of storing the data or information that an array is described as being able to store. A linked list, for example, is included in this definition of "array." All attributes in this application, unless otherwise stated, should be interpreted as comprising either a single attribute or an array of attributes.

This application is directed to methods of scheduling video content. Services of the inventive subject matter facilitate scheduling of video content for channel where the content schedules are different depending on the time zone from which a user accesses the content on that channel. There exists a need for this type of scheduling system because internet streaming services can be accessible around the globe, not just in a particular region or country (e.g., the United States), and it can also be useful when countries span many different time zones. When scheduling content that can be accessed anywhere around the entire world, it becomes necessary to account for different restrictions and requirements present in different time zones, such as incorporating live content into a schedule.

Systems and methods of the inventive subject matter facilitate making streaming content available based on geographic location. For example, instead of requiring implementation of a tape delay, video content can simply be accessed at different times in an on-demand fashion from content host according to a channel schedule. Thus, systems and methods of the inventive subject matter eliminate the costs of, for example, broadcasting a channel's content to satellite which is then downlinked by individual cable operators who then must record, store, and rebroadcast the tapings according to their local area.

Thus, methods of facilitating the scheduling of time zone specific content (e.g., video content that is either live or pre-recorded) are contemplated in this application. To create content schedules that are specific to different time zones, methods of the inventive subject matter involve interactions between service hosts and client-side computers. Service hosts can run on one or more servers or content hosts (e.g., YouTube and its servers). It is contemplated that a server can be one or more computing devices that are configured for remote network access, including cloud networks.

Methods of the inventive subject matter include steps whereby requests are sent from a client to a service host, and, in response, the service host sends responses to the client. One such method is shown in FIGS. 1A & 1B. As shown in step 100, a service host receives a request from a client, where the request includes schedule requests for one or more schedules (e.g., an array of schedule requests). Each schedule request corresponds to a time zone, where multiple schedule requests can correspond to different time zones from one another. This first request is sent because, when a client desires to create, modify, or implement a content schedule, that client must first ascertain the existing schedule in each time zone. The number of schedule requests in the request depends on how many different time zones the client wishes to create, modify, or implement a schedule for (which can, for example, be determined by the client checking boxes for various time zones before initiating the request). Thus, the request is sent to a service host by a client to gather existing schedule information for each time zone selected by a client, enabling the client to create, revise, or implement schedules for each time zone selected by the client.

The request also includes a station ID, and, in some embodiments, it includes a date and a time. When a client navigates to a page for a particular station (also referred to as a "channel"), and then requests schedules for that station across multiple time zones, the request identifies the station using its station ID. A station ID can be, for example, a UUID or it can be an internal identifier that is unique within the service host, but not necessarily universally unique.

The request can also include a date, and, in some embodiments, a time. The date and time are useful in informing the service host of the date and time where the client is located so that the service host can identify schedules to return to the client. It is also contemplated that the service host can determine a date and time based on the date and time that it receives the request from the client. For example, if a client sends a request on January 5, the service host can return schedules for January 3-8. It is contemplated that the service host can return schedules on either side of the date sent by the client (e.g., up to 5 days prior and up to 5 days after the date that the client sends in the request, though it is also contemplated that the window can be up to a year long, in some embodiments, to facilitate scheduling entire seasons of shows). When a time is included in the request, it can be used to identify a time zone in which the client is located. It can also be used to include scheduling information that is determined by time instead of just by date. For example, if a request is sent at 4 pm on January 5, the response to the request can include schedules for the channel through 4 pm on January 8.

As shown in step 102, in response to the request, the service host sends, to the client, a response. In some embodiments, the response is based on the stationID (e.g., only schedules for the channel corresponding to the stationID are returned in the response). As described above, in some embodiments, the response is also based on one or both of the date and time from the request. The response includes a channel schedule corresponding to each schedule request in the array of schedule requests. Each channel schedule includes a timeline having one or more scheduled episodes and a timeZoneID corresponding to the schedule. Each of the one or more episode includes episode attributes. Episode attributes can one, or any combination of: a category color, a duration, an ID, an isLive attribute, an episode name, a release time, a show name.

A category color can be used to identify categories for episodes or shows. Based on, for example, a show or episode's category, a color can be associated with that show or episode. For example, an episode or show that is directed to history can associated with a first color, while an episode or show directed to reality television can be associated with a second color. Color can be defined by, for example, hexadecimal color code (e.g., #cccccc).

A duration can include a total runtime of an episode or segment of an episode. In some embodiments, the duration can include a duration time remaining in an episode if the episode it relates to is already partway through broadcast.

The ID that is included in the episode attributes can be an episode ID. An episode ID comprises a unique identifier for an episode on a channel. In some embodiments, the episode ID corresponds to an episode where an episode comprises an array of episode segments. Each episode segment is associated with a video or portion of a video (e.g., a YouTube video), where multiple episode segments put together make up an episode. Thus, when a client sends a request that includes a schedule request for a particular channel in a particular time zone, the service host responds with schedule information that includes times that episodes are set to play on the channel corresponding to the station ID, where episodes are identified by the service host according to an episode ID.

An episode ID can be assigned to an episode by the service host. It is contemplated that an episode ID can be a UUID, although this is not required, and the episode ID can alternatively take on a form that can uniquely identify an episode within the service host without being universally unique.

An isLive attribute can indicate whether an episode is a live broadcast. The isLive attribute can be a binary identifier, though this is not a requirement, so long as the isLive attribute contains sufficient information to identify whether an episode is live. For example, if an episode in a schedule is to be broadcast live, then the isLive attribute can be set to TRUE or "Yes," or any other indicator that the service host and the client can interpret as an affirmative indication.

A name attribute can be a written-language identifier of an episode (e.g., an episode title). In some embodiments, the name can include additional information about an episode (e.g., "s03e15"), or a shorthand name for an episode. The name attribute can be stored as a string.

A release time attribute can include information about when an episode can be accessed (e.g., when an episode can be streamed by a client). In some embodiments, the release time attribute depends on the timeZoneID (e.g., it depends on the time zone corresponding to the schedule where the episode exists). It includes a time, and, in some embodiments, it includes a date.

A showName attribute includes a name of a show to which an episode (or episodes) belongs. A show name relates to the name of a show that can be delivered episodically. For example, the shows "Lost" or "Party of Five" include episodes that belong to those shows. The showName attribute can be stored as a string.

Next, as shown in step 104, the service host receives, from the client, a request for a listing of available episodes. In this step, the client is requesting a listing of episodes that are available for assignment to the one or more schedules that are returned in the previous response. The request for a list of available episodes includes a stationID. In some embodiments, the service host uses the stationID so it can return only those episodes that can be scheduled on the channel associated with that stationID. The service host can also use the stationID to associate a schedule change with the correct channel according to the stationID.

It is contemplated that the step of requesting a listing of available episodes (and the subsequent response) can occur before the steps discussed above where the client requests one or more channel schedules and the service host responds with those channel schedules.

The request for a listing of available episodes can also include a filter parameter. In some embodiments, the filter parameter can be a word that appears in one of the episode attributes, and in other embodiments the filter parameter can be correlated with an episode attribute (e.g., the filter is for episodes belonging to a particular category, genre, premium package, etc.). When a service host receives the filter parameter, it can then return only those episodes that either directly or indirectly correlate with the filter parameter (e.g., if the filter parameter is the title of a show, then that show will be identified by the service host to be returned to the client).

The service host thus identifies one or more episodes according to the stationID and, in some embodiments, the filter parameter, as shown in step 106. As shown in step 108, the service host next generates a listing of episodes that includes the one or more episodes that it identified according to the stationID and the filter parameter. The step of generating a listing of available episodes can be a de facto consequence of the step of sending the listing in another method step instead of a discrete step that takes place prior to sending the list to a client (e.g., the listing is generated "on-demand" so that it can be sent to the client in the step of sending the listing of available episodes). Next, the service host sends, to the client, the listing of available episodes where the listing of available episodes includes episode attributes (as described above) for each episode in the listing, as shown in step 110. It is contemplated that the service host can generate a different listing of episodes for each time zone identified above by the schedule request.

The step of requesting a list of available episodes and the subsequent step of identifying at least one episode are only included in some embodiments, and it is contemplated that methods of the inventive subject matter do not require these steps to take place as shown by the dotted line in FIG. 1A.

Once the client receives one or more episode listings, the user can select episodes and place them into one or more schedules. It is also contemplated that the user can rearrange existing episodes on one or more schedules. Once a user is done creating or modifying a content schedule, the user must then implement that schedule. It is contemplated that this can be done by the user causing the client to send a request to create an updated schedule to the service host. The request to create an updated schedule can include sufficient information to update one or more schedules.

As mentioned above, it is also contemplated that the times at which an episode or episodes can be made available for viewing can be selected based on time zone. For example, a user can select episode A to be made available at 1 PM in the Pacific time zone (a first schedule), but to be made available at 2 PM in the eastern time zone (a second schedule).

In some embodiments, a user operating a client, based on the activities of the previous steps, is shown (e.g., on a display that is directly or indirectly connected to the client) an existing schedule for each time zone that was identified in the schedule requests, above. Thus, the user can visually add episodes to each schedule based on the existing schedules, or the user can change the existing schedules by, for example, taking some episodes off of the existing schedules, adding new episodes to the existing schedules, or rearranging episodes that are already on those existing schedules. Thus, the client's request to create one or more updated schedules is created based on inputs, selections, and decisions from the client about what episodes to schedule at what times and in what time zones.

Thus, in a next step, the service host receives, from the client, a request to create an updated schedule, as shown in step 112. The request includes an updated timeline and a timeZoneID, where the timeZoneID enables the service host to identify which schedule (e.g., the schedule for a particular time zone) should be updated. The updated timeline includes information sufficient to identify each episode in the updated timeline and to identify when each episode in the updated timeline should be made available. It is contemplated that each updated timeline includes, for each episode, an episodeID (e.g., to identify the episode), a release date (e.g., to provide instructions about a date when the episode should be made available), and a release time (e.g., to provide instructions about a time when the episode should be made available on the release date). The updated timeline is generated according to a user's actions described above.

The request to create an updated schedule can include as few or as many updated timelines with associated timeZoneIDs as necessary (e.g., 1 or more), which is based on the quantity of schedules in different time zones that a user modifies or creates (e.g., based on the number of channel schedule requests in the array of channel schedule requests). It is contemplated that a request to create an updated schedule can include an updated timeline even if the associated timeline was not modified.

Once the service host receives the request to create an updated schedule, it can then use the information in that request to update, modify, or create one or more schedules based on the number of schedules that the client affected. The schedule or schedules that are modified are then used by the service host to determine when third party users in various time zones can access the content on the channel or channel for which the schedule or schedules have been modified. This step is shown in step 114, and it is connected to the preceding steps by a dotted line because is not a required method step for purposes of the inventive subject matter.

In another aspect of the inventive subject matter, as shown in FIGS. 2A & 2B, a method of facilitating simultaneous scheduling of one or more shows across multiple time zones is contemplated. In embodiments of these methods, a user on a client machine is enabled to schedule one or more shows into one or more timeslots across one or more time zones. For example, a user could, through a graphical user interface on a client machine, select several time zones, select several shows (e.g., where each show has one or more episodes), select one or more timeslots (e.g., Mondays at 9 PM and Thursdays at 8 PM), select a range of dates, and then quickly schedule those shows into the timeslots across the several time zones. Methods of these embodiments facilitate this type of scheduling.

In one example, a user can select a timeslot (e.g., where the timeslot is 4 pm on Tuesdays) for a show and then schedule that entire show to run during that timeslot, where each subsequent instance of that timeslot coming up (e.g., each subsequent Tuesday) includes a subsequent episode of that show being scheduled. Thus, a user can easily schedule 10 episodes of a show to play in sequence in a desired timeslot where each episode is automatically scheduled during a 10-week timespan, and that user can do this for multiple time zones, using the same or different timeslots for each time zone.

Thus these methods facilitate scheduling of a show having multiple episodes to be made available for streaming on, for example, a particular day (or set of days) at a particular time (or set of times). By selecting a show and scheduling that show to be made available on a particular day and time, each subsequent day that the show is made available can make a different episode available. Methods of the inventive subject matter further make it possible to create these schedules across multiple time zones.

To create a schedule, a user on a client computing device can be presented with a user interface that allows that user to select one or more shows (e.g., content), select one or more time zones, and select a release pattern, as shown in step 200. A release pattern can include a date range (e.g., a from date and a to date), a timeslot, and a day. Once a user has made the appropriate selections, the user then causes the client to send, to the service host, a request to schedule content, as shown in step 202.

The request to schedule content includes: show information and an array of time zone information, and it can also include a from date, a to date, a time, and a day. The show information includes one or any combination of a show ID, a show name, and a season indicator (e.g., season 1, season 2, etc.). The array of time zone information includes, for each time zone in the request, a time zone ID, and can also include a time zone code and a time zone display name. It is contemplated that the array of time zone information can include additional time zone IDs, time zone codes, and time zone display names, depending on how many time zones are implicated in the request to schedule content.

The service host then processes the request to schedule content, as shown in step 204. It updates as many schedules as there are timeZoneIDs in the request to schedule content, using the show information to correctly schedule the desired show in one or more time slots. It is contemplated that, for example, the service host can use the information in the request to schedule content to schedule a show having multiple episodes, where the show is schedule to run from the "from date" to the "to date" according to those attributes. The show is scheduled to be made available for streaming according to the "time" and "date" attributes. Thus, for each subsequent time and day during the span of time between the "from date" and "to date," a different episode of the show is scheduled. In some embodiments, the episodes are scheduled in a pre-determined order, and in other embodiments, the episodes are scheduled in a random, or pseudo-random, order.

It is contemplated that the request to schedule content can include information for a plurality of shows, where each show in the plurality of shows has an associated array of time. In this way, the service host can use the request to schedule content to create or schedules for multiple shows in multiple time zones, saving time and energy on behalf of the scheduler.

In response to the request to schedule content, it is contemplated that the service host can send a response that includes a confirmation attribute. The confirmation attribute can indicate to the client whether the service host successfully scheduled the content per the request to schedule content.

It is contemplated that any of the methods described in this application can be carried out by one or more computing devices. For example, it is contemplated that methods of the inventive subject matter can be carried out by a combination of: a network interface configured to communicate over a network, a computing system comprising one or more computing devices, and a computer storage system comprising a non-transitory storage device, where the computer storage system stores executable program instructions that direct the computer system to carry out the method steps described above. The computer can be, for example, one or more servers. The computer (or one or more servers) are represented by the "service host" as shown in FIGS. 1B and 2B.

Thus, specific methods of scheduling content have been disclosed. It should be apparent, however, to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A networked, programmatic method of scheduling video content, comprising the steps of:

receiving, from a client by a server, a request for a first schedule corresponding to a first time zone and a second schedule corresponding to a second time zone, the request comprising a station ID;

sending, by the server to the client, a response based on the station ID and at least one of the date and the time, the response comprising:

a first schedule comprising (1) a first timeline comprising a first episode having first episode attributes and (2) a first timeZoneID corresponding to the first time zone, wherein the first episode attributes comprise a first episode ID and a first release time;

a second schedule comprising (1) a second timeline comprising a second episode having second episode attributes and (2) a second timeZoneID corresponding to the second time zone, wherein the second episode attributes comprise a second episode ID and a second release time;

sending, to the client, a listing of available episodes, the listing comprising episode attributes associated with at least one episode, the episode attributes comprising a third episode ID;

receiving, from the client, a third request to create a first updated schedule, the third request comprising (1) a first updated timeline and (2) the first timeZoneID, the first updated timeline comprising:

a first episodeID; a first release date; and a first release time;

receiving, from the client, a fourth request to create a second updated schedule, the fourth request comprising (1) a second updated timeline and (2) the second timeZoneID, the second updated timeline comprising:

a second episodeID; a second release date; and a second release time.

2. The method of claim 1, further comprising the steps of:
creating the first updated schedule using the third request and the first schedule; and
creating the second updated schedule using the fourth request and the second schedule.

3. The method of claim 1, wherein the request for the first schedule further comprises a date and a time.

4. The method of claim 1, wherein the first episode attributes further comprise at least one of:
a first categoryColor;
a first duration;
a first isLive attribute;
a first name; and
a first showName.

5. The method of claim 1, wherein the second episode attributes further comprise at least one of:
a second categoryColor;
a second duration;
a second isLive attribute;
a second name; and
a second showName.

6. The method of claim 1, further comprising the steps of:
receiving, from the client, a second request for the listing of available episodes, the second request comprising the stationID and a filter parameter;
identifying at least one episode according to the stationID and the filter parameter;
and generating the listing of available episodes comprising the at least one episode.

7. The method of claim 1, wherein episode attributes further comprise:
a categoryColor;
a duration;
an isLive;
a name; and
a showName.

8. A system comprising:
a network interface configured to communicate over a network;
a computing system comprising one or more computing devices; and
a computer storage system comprising a non-transitory storage device, said computer storage system having stored thereon executable program instructions that direct the computer system to at least:
receive, from a client, a request for a first schedule corresponding to a first time zone and a second schedule corresponding to a second time zone, the request comprising a station ID;
send, to the client, a response based on the station ID and at least one of the date and the time, the response comprising:
a first schedule comprising (1) a first timeline comprising a first episode having first episode attributes and (2) a first timeZoneID corresponding to the first time zone, wherein the first episode attributes comprise a first episode ID and a first release time;
a second schedule comprising (1) a second timeline comprising a second episode having second episode attributes and (2) a second timeZoneID corresponding to the second time zone, wherein the second episode attributes comprise a second episode ID and a second release time;
send, to the client, a listing of available episodes, the listing further comprising episode attributes associated with at least one episode, the episode attributes comprising a third episode ID;
receive, from the client, a third request to create a first updated schedule, the third request comprising (1) a first updated timeline and (2) the first timeZoneID, the first updated timeline comprising:
a first episodeID; a first release date; and a first release time;
receive, from the client, a fourth request to create a second updated schedule, the fourth request comprising (1) a second updated timeline and (2) the second timeZoneID, the second updated timeline comprising:
a second episodeID; a second release date; and a second release time.

9. The system of claim 8, wherein the executable program instructions further direct the computer system to at least:
create the first updated schedule using the third request and the first schedule; and
create the second updated schedule using the fourth request and the second schedule.

10. The system of claim 8, wherein the request for the first schedule further comprises a date and a time.

11. The system of claim 8, wherein the first episode attributes further comprise at least one of:
a first categoryColor;
a first duration;
a first isLive attribute;
a first name; and
a first showName.

12. The system of claim 8, wherein the second episode attributes further comprise at least one of:
a second categoryColor;
a second duration;
a second isLive attribute;
a second name; and
a second showName.

13. The system of claim 8, further comprising the steps of:
receiving, from the client, a second request for the listing of available episodes, the second request comprising the station ID and a filter parameter;
identifying at least one episode according to the station ID and the filter parameter;
and generating the listing of available episodes comprising the at least one episode.

14. The system of claim 8, wherein episode attributes further comprise:
a categoryColor;
a duration;
an isLive;
a name; and
a showName.

* * * * *